United States Patent [19]

Lepoutre et al.

[11] Patent Number: 5,067,693
[45] Date of Patent: Nov. 26, 1991

[54] ELECTRIC ARC OVEN FOR TREATING MOLTEN METALS WITH A GAS AND A PROCESS THEREFOR

[76] Inventors: Etienne Lepoutre, 5743 S. Thurlow, Hinsdale, Ill. 60521; Michel Devaux, 45 avenue de Chevincourt, Cressely, 78470 Magny-Les-Hameaux, France; Bruno Hirschberg, Erlgasse 40, A-1120 Vienna, Austria; Franz A. Petio, Angerweg 32, A-8650 Kindberg, Austria; Paul Weitzer, Berggasse 4, A-1090 Vienna, Austria

[21] Appl. No.: 492,140

[22] Filed: Mar. 13, 1990

[30] Foreign Application Priority Data

Mar. 15, 1989 [FR] France .................................. 89 03381

[51] Int. Cl.$^5$ ............................................ C21B 13/00
[52] U.S. Cl. ............................... 266/44; 266/220; 266/267
[58] Field of Search ............... 260/216, 220, 265, 270, 260/44; 266/267

[56] References Cited

U.S. PATENT DOCUMENTS 4,695,043  9/1987  Winkelmann et al. .............. 266/265
4,711,432  12/1987  Heinz et al. ........................ 266/270

FOREIGN PATENT DOCUMENTS 1555947  1/1969  France ................................. 266/220
0017804  5/1984  Japan .................................. 266/220

*Primary Examiner*—S. Kastler
*Attorney, Agent, or Firm*—Oblon, Spivak, McClelland, Maier & Neustadt

[57] ABSTRACT

Electric arc oven for melting scrap iron of the type comprising a vat lined with an inner coating made of refractory material which is called the sole of the oven, lateral walls, a vault capping the upper opening of the vat, openings provided in the vault through which the electrodes extend, and a tapping nozzle or eccentric tapping hole. In this oven, the sole is provided with at least one device for injecting gas to stir the molten metal. The injection device includes a low injector formed of a compact block made of dense non-porous refractory material through which extend one or a plurality of, preferably less than 50, hollow metallic tubes or slits or channels along its entire height in the direction of gaseous blowing and permitting gas to pass therethrough. The low injector is surmounted by a body of porous rammed earth whose initial thickness is 50 to 300 mm, is composed of unshaped refractory material in the form of granular particles having a diameter of at least 10 mmg, and the granulometry of the porous rammed earth has a permeability between 100 and 300 Namoperm after fritting under heat. A process of melting scrap iron using this oven is also disclosed. The gas is sent in the molten metal by first passing through the low injector then through the layer of porous rammed earth, Gas flows through at a feeding pressure of at most 10 bars and a flow rate of at least 20 Nm$^3$/h after fritting under heat.

19 Claims, 3 Drawing Sheets

ELECTRIC ARC OVEN FOR TREATING MOLTEN METALS WITH A GAS AND A PROCESS THEREFOR

BACKGROUND OF INVENTION a) Field of the Invention

The present invention relates to the treatment of molten metal with a gas in electric arc ovens of the type comprising:
- a vat lined with an inner coating of refractory material, said coating being called sole,
- lateral walls,
- a vault capping the upper opening of the vat, holes being provided in the vault through which electrodes extend,
- tapping means (tapping nozzle or eccentric tapping holes).

It is customary to use a gas to ensure the stirring of molten metal.

b) Description of Prior Art

Currently, in laddles for molten steel, devices for injecting inert gases through the bottom are used. In this case, the utilisation of an inert gas gives a better homogenization of liquid steel, with respect to chemical composition and temperature. Similarly, in converters where oxygen is blown from the top, and an inert gas is blown from the bottom, and gas stirring is specifically used to homogenize the molten metal and to accelerate chemical reactions between metal and slag.

The melting of scrap iron with an electric arc oven has many disadvantages, which, inter alia, are the following:
- the energy supplied by the electric arcs is absorbed mainly in the zone of the electrodes and in the upper part of the metallic bath, which brings about a non-uniform distribution of the temperature of the metallic bath. This non-uniform distribution leads to an increase of the electric energy required for melting the steel located in the colder zones.
- in an arc oven, the bath of liquid steel is not very high and covers a large surface area which contributes to the fact that liquid steel has a heterogenous chemical composition.
- blowing of oxygen during periods of melting or refining, brings about an overoxidation of the iron at the surface of the metallic bath,
- the chemical reactions between metal and slag take place mainly at the surface of the metallic bath and are not influenced by the weak movements of liquid steel.

It is usually recognized that these disadvantages can be minimized by stirring steel from the bottom of the arc oven.

Many devices for stirring molten steel are known. According to a known process, liquid steel in a laddle is set in motion by introducing an inert gas through the bottom by means of a porous refractory material. This process utilizes a refractory brick or a porous plug which has the property of being permeable to a gas under pressure but is impermeable towards molten metal. The porous plug is part of the refractory coating of the laddle. It is mounted so as to be covered with liquid metal when the laddle is full. Stirring is obtained by injecting a gas through the porous plug or through the refractory brick.

Up to now the application of this technology to an arc oven has not been industrially developed because the lifespan (at most 40 cycles in continuous operation) of the porous plugs or refractory bricks is insufficient in view of the restraints inherent to the exploitation of an arc oven which prevent the device for injecting gas to be replaced without loss of productivity.

According to another known process, which uses a converter where oxygen is blown from the top, the stirring of the molten metal with an inert gas is made possible by means of a device made of a body of non-porous material having localized discontinuities spreading along its entire height in the direction of the gaseous blowing and permitting the gas to flow. Up to now these devices for stirring molten metal were not significantly used in arc ovens because of the specific requirements of the latter. Indeed, the thermic restraints of the refractory material of the sole of an arc oven increase with the thinness of the sole as compared to the bottom of a converter. Moreover, when pouring of the liquid steel is carried out through an eccentric tapping hole, there are normally some remains of liquid metal or bath bottom in the oven, which cover the opening of the injection devices and prevent them from being inspected. These disadvantages are still increased in an arc oven as a result of the importance of the movements of gas and liquid metal which, with the fall of scrap iron when loading, produces important mechanical restraints. In addition, there is a chemical erosion of the refractory material of the sole of the arc oven resulting from chemical reactions between refractory material, liquid metal and slag. For all these reasons, the stirring techniques with an inert gas used in a converter could not be directly applied to an arc oven.

There is also a procedure for stirring molten metal in an arc oven by using an electromagnetic effect. This process is implemented by means of a device mounted underneath the vat of the arc oven. It has the disadvantages that the stirring power has some limitation and of requiring costly investments.

Another process, described in British Patent No. 2,192,446, enables to stir the liquid steel at the bottom of the arc oven through an injection device comprising a brick of refractory material through which small tubes extend along the entire length of the brick in the direction of blowing. In this device, the small metallic tubes are in direct contact with the liquid metal during a melting cycle in an arc oven, which prevents from electrically insulating the metallic enclosure of the oven from the mass of molten metal without adding a system of electrical insulation which is specific to the injection device. Moreover, when the injection device is damaged, it must be replaced but this can only be done when the electric oven is stopped, which results in a loss of productivity.

Another process, described in European Patent No. 0240998, enables the stirring of liquid steel at the bottom of the arc oven by means of tuyeres. In this process, it is not possible to stop using or to start to use the gas again during a cycle.

It is an object of the present invention to improve the technique of injecting gas at the bottom of an arc oven while minimizing the risks of break of the sole and enabling to rapidly repair the devices for injecting gas when they are worn out, without having to cool the sole of the oven and without any loss of productivity. Another object of the invention is to permit an electrical insulation between the molten metal and the metallic frame of the arc oven which is simple and natural.

SUMMARY OF INVENTION

These objects can be achieved according to the invention, in that each device for injecting gas mounted in the sole of the oven comprises, a low injector formed of a compact block made of a dense and non-porous refractory material through which a plurality of hollow metallic tubes or slits, or channels extend, along its entire height in the direction of gaseous blowing and permitting gas to pass therethrough, said low injector being surmounted by a mass of porous rammed earth whose initial thickness is 50 to 300 mm, said porous rammed earth being composed of unshaped refractory material in the form of granular particles having a diameter of at most 10 mm permitting the passage of gas under pressure after fritting under heat. The porous rammed earth also has the property of being impermeable to liquid metal. Because of its composite structure since it is formed of a low injector surmounted by a body of porous rammed earth, the molten metal is prevented from contacting the hollow metallic tubes or the channels or the slits of the low injector. The fact that the porous rammed earth is impermeable with respect to liquid metal thus prevents any plugging or infiltration of liquid metal which could take place in case of even shorter interruption of the gas which is fed for stirring under pressure. In this manner, there is no wear of the low injector, whether this wear is thermic, chemical or mechanical. Moreover, repair of the porous rammed earth can be carried out without any problem, without waiting for the sole of the arc oven to cool down and in a very short period of time. The cross-section of the tubes or the like is preferably between 0.12 and 500 mm$^2$.

This repair is carried out by applying a quantity of porous rammed earth of the same type as the original porous rammed earth, above the low injector. This body of porous rammed earth enables, after fritting under heat without gas flow, to obtain a gas flow under pressure until the desired flow is reached. In general, the feeding pressure of the injection device is between 1 and 10 bars. In addition, when continuous stirring is not necessary, the injection of gas can be stopped, which may represent an economical improvement and especially a determining safety factor in case of inadvertent stop of the gas feed.

According to an embodiment, the low injector is laterally unitary with the refractory material of the sole, extends away below the inner face of the sole and is in contact with a body of porous rammed earth which extends to the internal level of the wall of the sole.

It is also an object of the invention to provide a process of melting scrap iron by providing an injection of inert gas in the molten metal contained in a sole of an electric arc oven, by means of at least one device for injecting inert gas, characterized in that the gas is sent into the molten metal by first passing through a low injector mounted in the refractory material of the sole then crossing through a layer of porous rammed earth of initial thickness between 50 and 300 mm, composed of unshaped refractory material formed of granular particles of a diameter of at most 10 mm and permitting the passage of gas under a feeding pressure of at most 10 bars at a flow rate of at least 20 Nm$^3$/h after fritting under heat. The inert gas can be argon and/or nitrogen and/or carbon dioxide and/or helium.

BRIEF DESCRIPTION OF DRAWINGS

The characteristics and advantages will appear from the description which follows, with reference to the annexed drawings, in which.

DESCRIPTION OF PREFERRED EMBODIMENT

Figure 1:
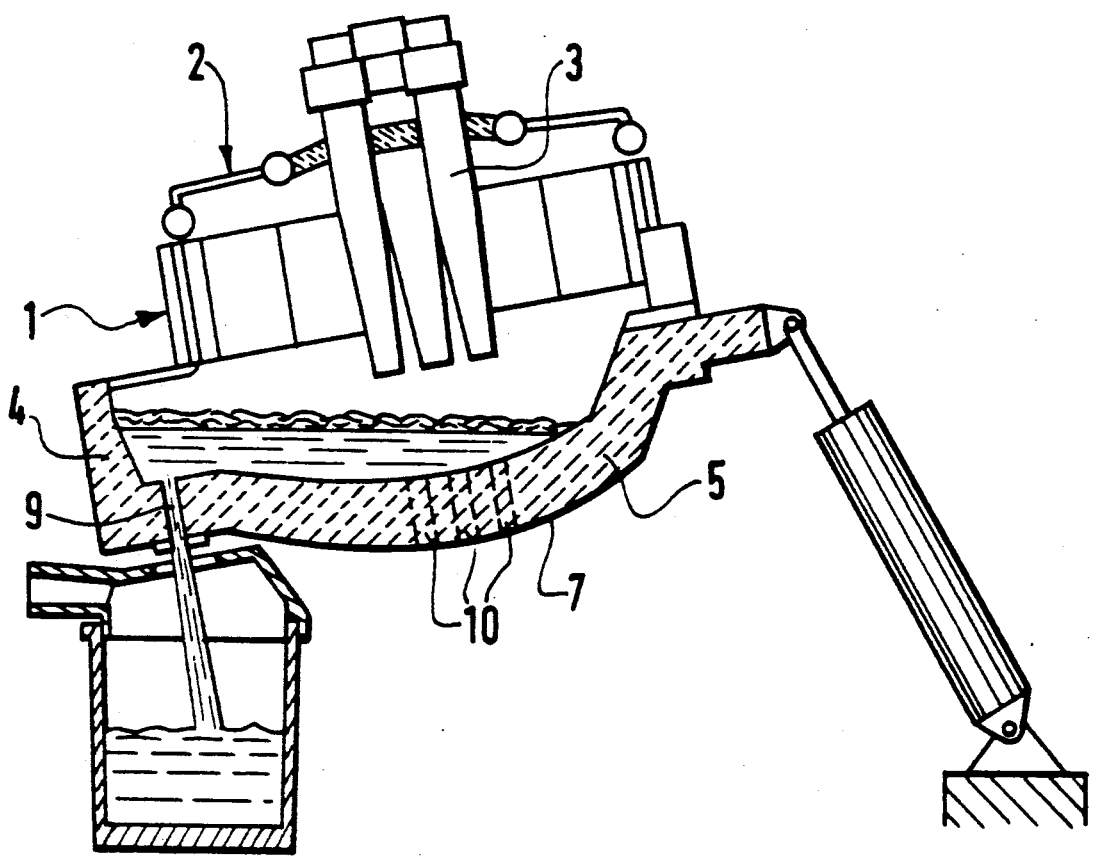
FIG. 1 illustrates an electric arc oven according to the invention.

FIG. 1, describes an electric arc oven for melting scrap iron comprising:
- a vat 7 lined with an inner coating of refractory material 8, said coating being called sole 5,
- lateral walls 1,
- a vault 2 capping the upper opening of the vat 7, through which openings are provided for allowing electrodes 3 to extend therethrough,
- an eccentric tapping hole 9 which can be replaced by a tapping nozzle.

The sole 5 of the oven is provided with one or more devices for injecting a stirring gas 10. Each injection device is positioned so as to increase stirring efficiency.

Figure 2:
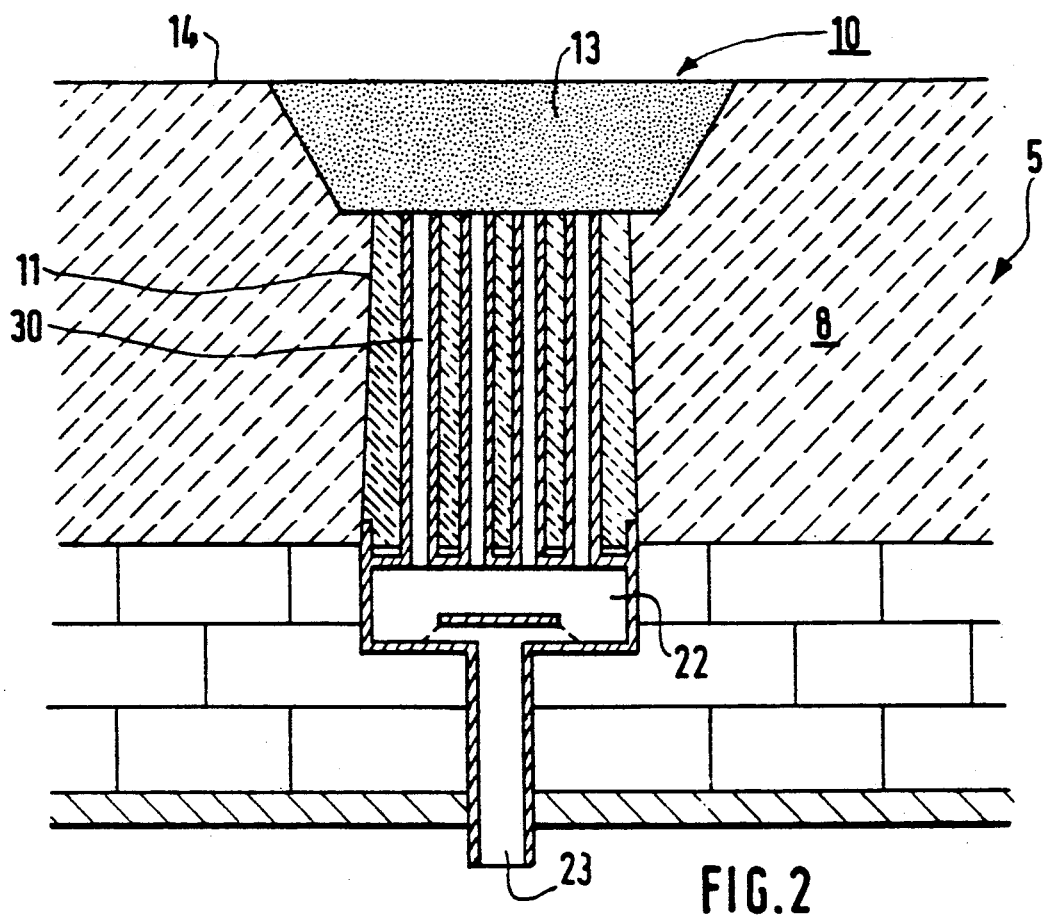
FIG. 2 illustrates an injection device used in the oven illustrated in FIG. 1.

FIG. 2 describes one of the injection devices 10 of FIG. 1.

The stirring device comprises a low injector 11 formed of a compact block of gas impermeable dense refractory material 12, a plurality of hollow metallic tubes or slits, or channels 30, extending through the compact block, along the entire length thereof and enabling gas to pass therethrough, said low injector 11 being surmounted by a body of porous rammed earth 13 of an initial thickness of 50 to 300 mm, said porous rammed earth 13 being composed of unshaped refractory material and formed of granular particles of a diameter of at most 10 mm so as to give a permeability between 100 and 300 nanoperm after fritting under heat. The porosity of the body of porous rammed earth is such that after fritting under heat it is possible to inject a gas at a flow up to 20 Nm$^3$/h with a feeding pressure not exceeding 10 bars. The height of the low injector 11 is smaller than the thickness of the wall of the sole.

The low injector 11 extends below the internal face 14 of the sole 5 and is in contact with the body of porous rammed earth 13 which extends to the internal level of the sole 5. According to this embodiment, the low injector is laterally unitary with the refractory material of the sole 5.

The low injector 11 constituting the inferior portion of the injection device is available in a plurality of embodiments.

Figure 3:
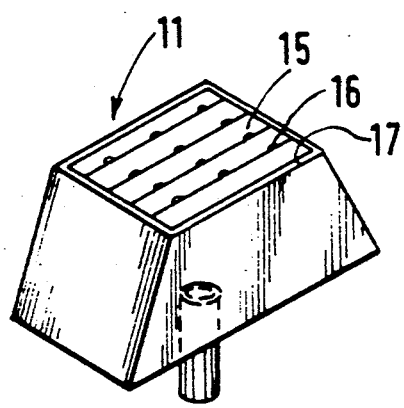
FIGS. 3, 4 and 5 are perspective views of three low injectors.
Figure 4:
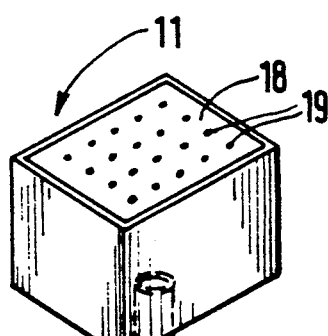
Figure 5:
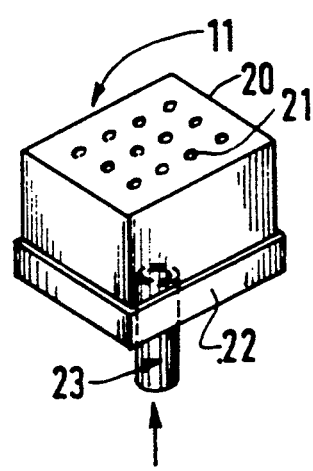

FIGS. 3, 4 and 5 describe different types of low injectors 11 which can constitute the lower portion of the injection device 10.

FIG. 3 describes a low injector 11 comprising an assembly of vertical plates of dense and non-porous refractory material 15, which are separated by means of slots 0.1 to 1 mm wide 16 enabling the gas to flow under pressure in the direction of blowing. According to another embodiment of low injector 11 the plates of refractory material have superficial grooves in their larger face, which once the plates are assembled, form rectilinear channels allowing for the flow of gas under pressure in the direction of blowing. In the two cases mentioned, the low injector 11 comprises a metallic sheath 17 which constitutes an enclosure which is impervious to gas and ensures that the various elements are held together.

FIG. 4 describes an embodiment of low injector 11 which is made of a compact block of dense non-porous refractory material 18, of appropriate cross-section, in which there is provided a plurality of fine channels 19 (between 4 and 50) of a diameter between 0.5 et 3 mm, in the direction of the gas flow. According to this embodiment, a metallic sleeve defines an enclosure which is gas impervious.

FIG. 5 describes another embodiment of low injector 11: this low injector 11 comprises a block of dense and non-porous refractory material 20 of appropriate cross-section, through which extend, along its entire length, in the direction of the gas flow, at least one and at most 50 hollow metallic tubes 21 of internal cross-section between 0.12 mm² and 500 mm². According to this embodiment, the hollow metallic tubes 21 are connected at their lower ends to openings of a gas distributing box 22 centrally provided with a tube 23 for feeding a stirring gas. If desired, the low injector 11, of FIG. 5 can comprise a metallic sheath defining an enclosure around the low injector 11 said enclosure extending along part or the entire length of the low injector 11 in the direction of blowing.

Figure 6:
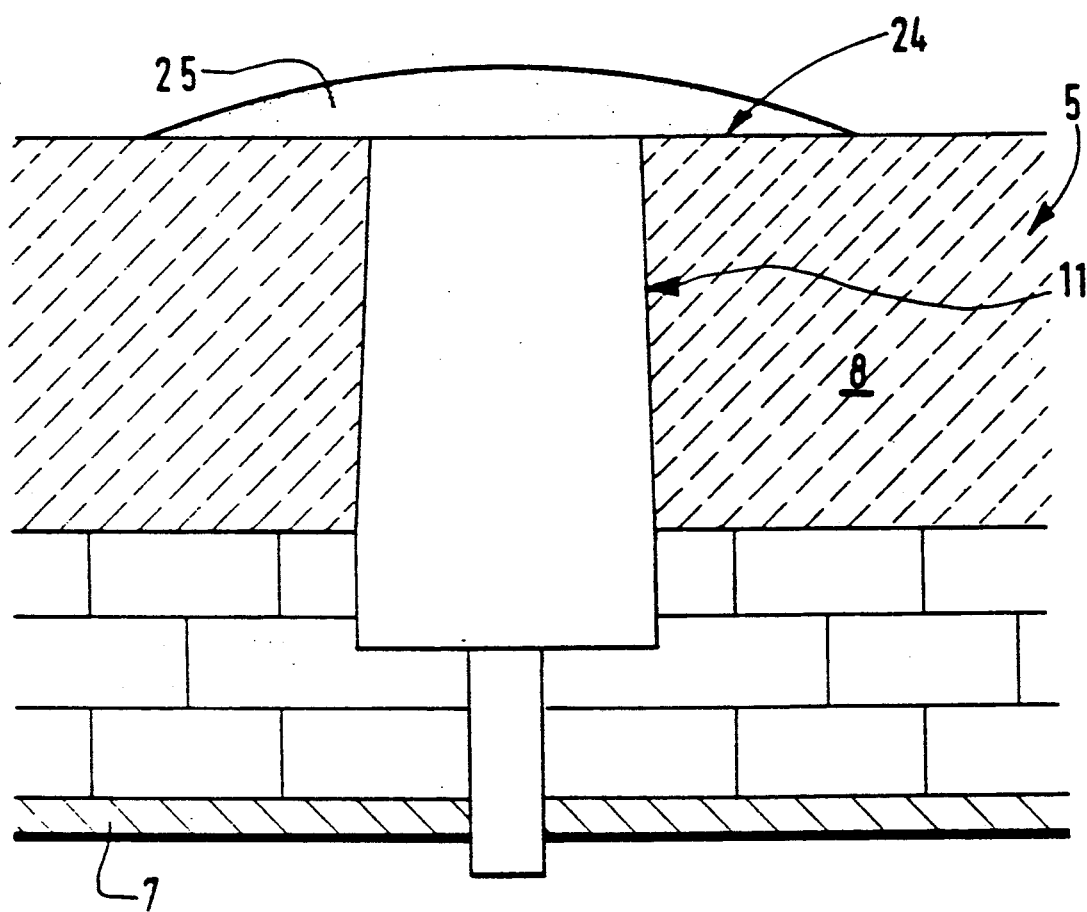
FIG. 6 represents an embodiment of the injection device illustrated in FIG. 2.

FIG. 6 represents an embodiment of the injection device 10 described in FIG. 2. According to this embodiment, the low injector 11 extends axially along the entire thickness of the sole 5 and is laterally unitary with the refractory material 8 of the sole 5. According to this embodiment, the low injector opens at the level of the inner wall of the sole 24 and the body of porous rammed earth 25 covers a portion of the internal wall 24 of the sole 5 and the totality of the upper face of the low injector 11.

EXEMPLIFIED EMBODIMENT

This exemplified embodiment is described with reference to FIG. 2. In this example, the low injector 11 comprises a block of dense and non-porous refractory material 12 essentially consisting of magnesia(MgO) and carbon, through which 30 hollow metallic tubes of circular cross-section, made of steel of diameter lower than 1 mm 30, extend along the entire length of the refractory block. The low injector 11 is surmounted by a body of porous rammed earth 13 whose initial thickness is 200 mm. This thickness is calculated so that the upper face of the body of porous rammed earth be at the same level as the internal face 24 of the sole.

The porous rammed earth is a dry ramming made of unshaped refractory material based on fritted magnesia in which the composition and the size of the granular particles are indicated in the table hereinbelow. The bulk density of the porous rammed earth is 2.2 kg/dm³. To operate the injection device, the low injector is firstly placed in the sole of the oven, then the porous rammed earth, in granular form without binder, is applied by dry ramming above the low injector in a pit provided therefor in the sole of the oven above the low injector. The apparent density of the rammed layer of porous rammed earth after drying at 200° C. is about 2.6 kg/dm³. The porosity of the quantity of porous rammed earth is such that when the low injector is fed under a pressure of at most 10 bars, the flow of gas passing through the body of porous rammed earth is at least 20 Nm³/h.

In a general manner, the chemical composition of the porous rammed earth based on fritted magnesia, can be summarized in the following manner:

|  | General Scope | Preferred Scope | Exemplified embodiment |
|---|---|---|---|
| MgO % by weight | 50 to 90 | 70 to 80 | 76 |
| Al₂O₃ % by weight | 0 to 5 | 0 to 1 | 0.5 |
| Fe₂O₃ % by weight | 2 to 7 | 3 to 6 | 5 |
| CaO % by weight | 5 to 20 | 15 to 20 | 17.5 |
| SiO₂ % by weight | 0 to 2 | 0 to 1 | 0.6 |
| size of grains (in mm) | 0 to 10 mm | 0 to 8 mm | 0 to 5 mm |

The permeability of the refractory layer, between 100 and 300 Nanoperm, is obtained by specific granulation of the porous rammed earth. According to a preferred embodiment, the sizes of the grains are distributed in the following manner:

0 to 0.5 mm: about 30% by weight
0.5 mm to 2 mm: about 30% by weight
2 mm to 5 mm: about 40% by weight According to another embodiment, the protective layer is made of a rammed earth composed of refractory material, preferably based on fritted magnesia, bound with tar and/or rosin and/or synthetic resin. This rammed earth offer a better adhesion of the layer. In operation, the tar or rosin or synthetic resin are destroyed by fire leaving fine channels through which the gas can escape.

We claim:

1. A process of melting scrap iron by injecting an inert gas in molten metal present in a sole of an electric arc oven, by means of at least one device for injecting an insert gas, said gas being fed into the molten metal by first passing through a low injector embedded in the refractory material of the sole, then through a layer of porous rammed earth of an initial thickness between 50 and 300 mm, consisting of an unshaped refractory material made of granular particles having a particle size distribution of: 0 to 0.5 mm: about 30% by weight, 0.5 to 2 mm: about 30% by weight, 2 to 5 mm: about 40% by weight and allowing gas to pass therethrough under a feeding pressure of at most 10 bars and a flow rate of at least 20 Nm³/h after fritting under heat.

2. A process according to claim 1, wherein the inert gas is selected from the group consisting of argon, nitrogen, carbon dioxide, helium and combinations thereof.

3. Process according to claim 1 or 2, wherein when the body of porous rammed earth is worn out, a repair of the injection device is carried out by applying porous rammed earth above the injection device without interrupting the operation of the electric oven and without allowing the sole of the oven to cool down.

4. Process according to claim 1, wherein there is an absence of contact of a metallic portion of the injection device, with the liquid metal during normal operation of the electric arc oven.

5. Process according to claim 1, wherein the injection of gas is stopped and started again through the injection devices to stir the molten metal at any moment during the normal operation of the oven without any plugging or damage to the devices for injecting gas.

6. An electric arc oven for melting scrap iron, comprising:
a vat lined with an inner coating of refractory material called the sole of the oven, lateral walls, a vault capping the upper opening of the vat, openings provided in said vault through which electrodes extend and a tapping nozzle or an eccentric tapping hole, said sole provided with at least one device for injecting gas to stir molten metal within the vat, said injection device including a low injector formed of a compact block made of dense and non-porous refractory material through which one or a plurality of hollow metallic tubes or slits or channels, extend along its entire height in the direction of gaseous blowing and allowing gas to pass therethrough, said low injector being surmounted by a mass of porous rammed earth whose initial thickness is 50 to 300 mm and is composed of unshaped refractory material in the form of granular particles having a particle size distribution as follows: 0 to 0.5 mm: about 30% by weight, 0.5 to 2 mm: about 30% by weight, 2 to 5 mm: about 40% by weight, the granulometry of the porous rammed earth being such that the body of porous rammed earth has a permeability between 100 and 300 nanoperm after fritting under heat.

7. Electric oven according to claim 6, such that the permeability of the body of rammed earth permits the flow of at least 20 $Nm^3/h$ per injection device under a feeding pressure of at most 10 bars.

8. Electric oven according to claim 6, such that the number of injection devices is at least one and at most 6.

9. Electric oven according to claim 6, wherein the porous rammed earth is a dry ramming, containing 50 to 90% by weight of magnesia MgO, 5 to 20% by weight of lime CaO, 0 to 5% by weight of alumina $Al_2O_3$, 0 to 2% by weight of silica $SiO_2$, 2 to 7% by weight of ferrous oxide $Fe_2O_3$.

10. Electric oven according to claim 9, wherein the rammed earth contains 70 to 80% by weight of magnesia MgO, 15 to 20% by weight of lime CaO, 0 to 1% by weight alumina $Al_2O_3$, 0 to 1% by weight of silica $SiO_2$, 3 to 6% by weight of ferrous oxide $Fe_2O_3$.

11. Electric oven according to claim 6, wherein the rammed earth is made of at least one refractory material and a binder consisting essentially of tar, rosin, synthetic resin or combinations thereof.

12. Electric oven according to claim 6, wherein said hollow metallic tubes, slits or channels number less than 50.

13. Electric oven according to claim 9, wherein said porous rammed earth is free from a binder.

14. Electric oven according to claim 6, wherein the low injector extends away below the inner face of the sole.

15. Electric oven according to claim 6, wherein the low injector extends substantially to the level of the inner face of the sole facing the covering layer of porous rammed earth which extensively runs over the inner wall of the sole.

16. Electric oven according to any one of claim 6, wherein the low injector consists of an assembly of vertical plates of dense non-porous refractory material, which are separated by means of slots having a thickness of 0.1 to 1 mm allowing for the passage of gas under pressure, said low injector being surrounded by a gas impervious metallic sheath.

17. Electric oven according to any one of claim 6, wherein the low injector consists of a compact block made of dense and non-porous refractory material, through which at least one and at most 50 hollow metallic tubes of cross-section between 0.12 $mm^2$ and 500 $mm^2$ extend along its entire height in the direction of blowing.

18. Electric oven according to any one of claim 6, wherein the low injector consists of a compact block made of dense and non-porous refractory material, in which between 4 and 50 fine channels of a diameter between 0.5 and 3 mm are provided in the direction of blowing.

19. Electric oven according to claim 6, wherein the low injector is laterally unitary with the refractory material of the sole.

* * * * *

UNITED STATES PATENT AND TRADEMARK OFFICE
CERTIFICATE OF CORRECTION

PATENT NO. : 5,067,693

DATED : November 26, 1991

INVENTOR(S) : Etienne Lepoutre, et al.

It is certified that error appears in the above-identified patent and that said Letters Patent is hereby corrected as shown below:

Column 6, line 42, claim 1, change "insert" to --inert--.

Signed and Sealed this

Seventeenth Day of August, 1993

*Attest:*

BRUCE LEHMAN

*Attesting Officer*    *Commissioner of Patents and Trademarks*